United States Patent

Dahlin

[15] 3,681,595
[45] Aug. 1, 1972

[54] BASIS WEIGHT GAUGE STANDARDIZING SYSTEM

[72] Inventor: Erik B. Dahlin, Saratoga, Calif.
[73] Assignee: Measurex Corporation, Santa Clara, Calif.
[22] Filed: April 3, 1970
[21] Appl. No.: 25,385

[52] U.S. Cl. .............................. 250/83 C, 250/83.3 D
[51] Int. Cl. ................................................. G01t 1/16
[58] Field of Search ......................... 250/83 C, 83.3 D

[56] References Cited

UNITED STATES PATENTS 3,348,046  10/1967  Lloyd .......................... 250/83 C
3,497,693  2/1970  Duftschmid et al. ...... 250/83.3 D Primary Examiner—Archie R. Borchelt
Assistant Examiner—Davis L. Willis
Attorney—Flehr, Hohbach, Test, Albritton & Herbert

[57] ABSTRACT

A method for standardizing a basis weight gauge which includes the calibration steps of obtaining two calibration curves, one of which is displaced from the other by a dirt simulation technique. The displacement between the two curves is expressed as a third curve. A standard sample of a predetermined basis weight is inserted in the radiation path to provide a standard shift in conjunction with the dirt simulation to provide a reference value for the displacement function curve. During actual use of the basis weight gauge standardization is provided by relating a current standard shift to the initial standard shift to correct the displacement function curve which is then related back to the original calibration curve to provide the actual basis weight of the sheet material being measured.

9 Claims, 5 Drawing Figures

PATENTED AUG 1 1972 3,681,595
SHEET 1 OF 3
FIG_1
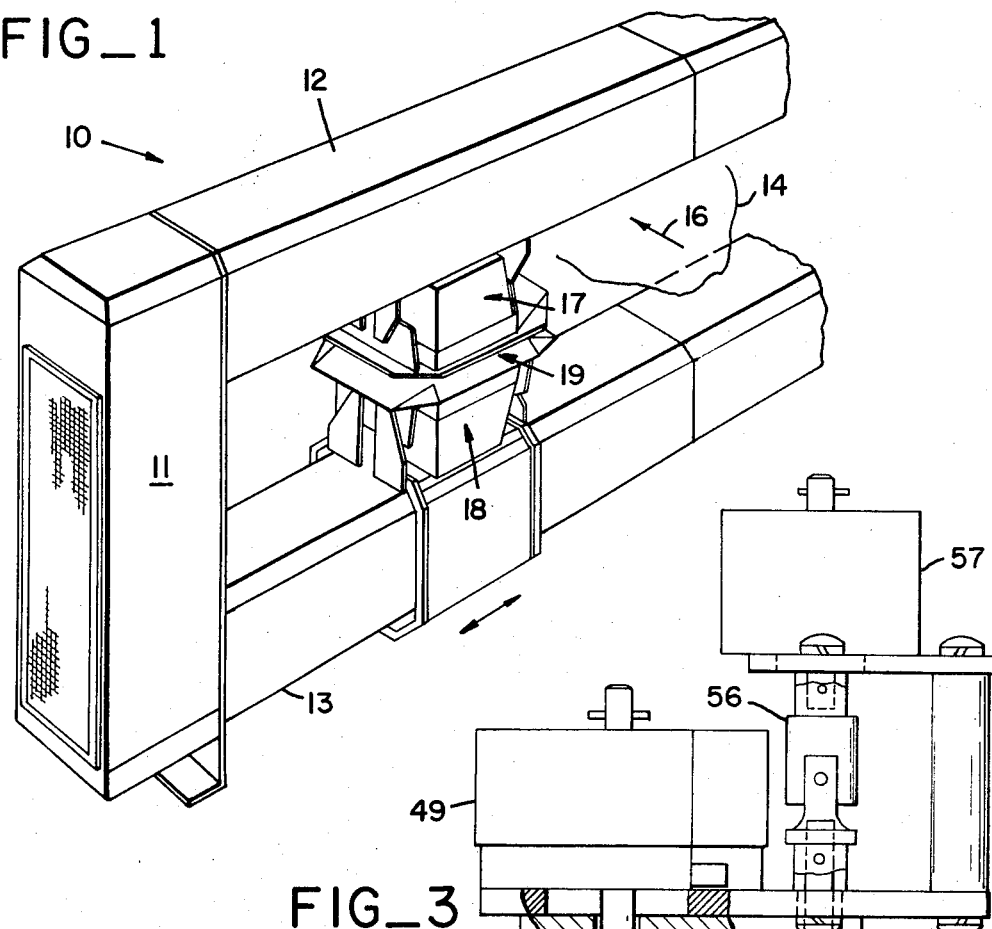
FIG_3
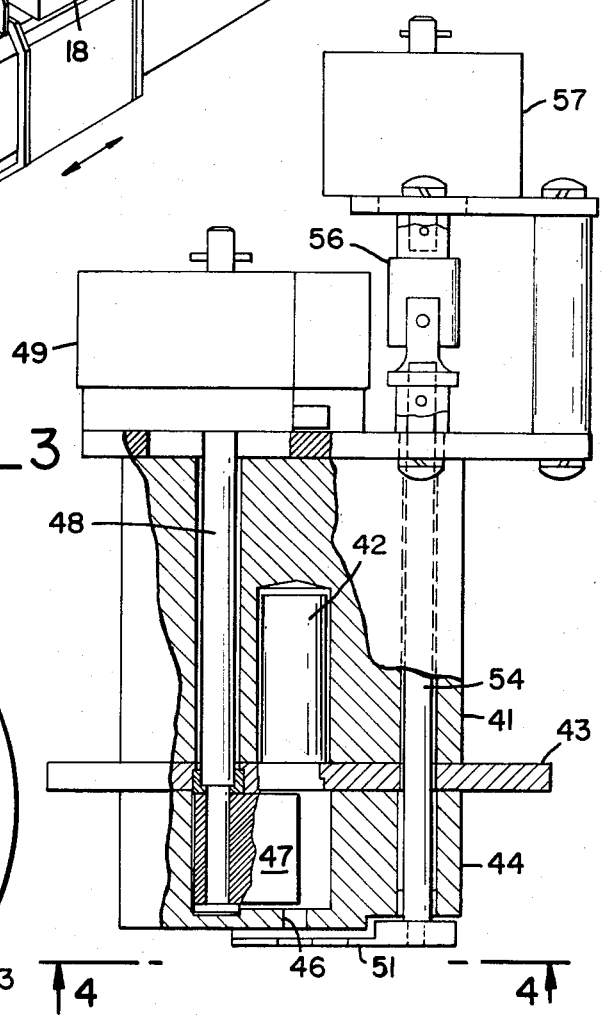
FIG_4
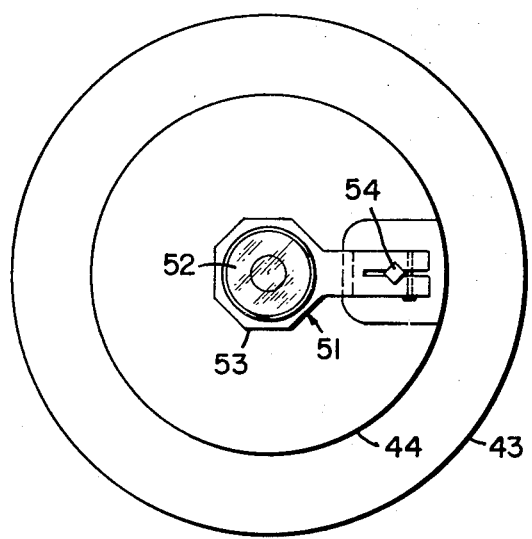
INVENTOR.
ERIK B. DAHLIN
BY
*F. Lehr, Hohbach, Test.*
*Albritton & Herbert*
ATTORNEYS

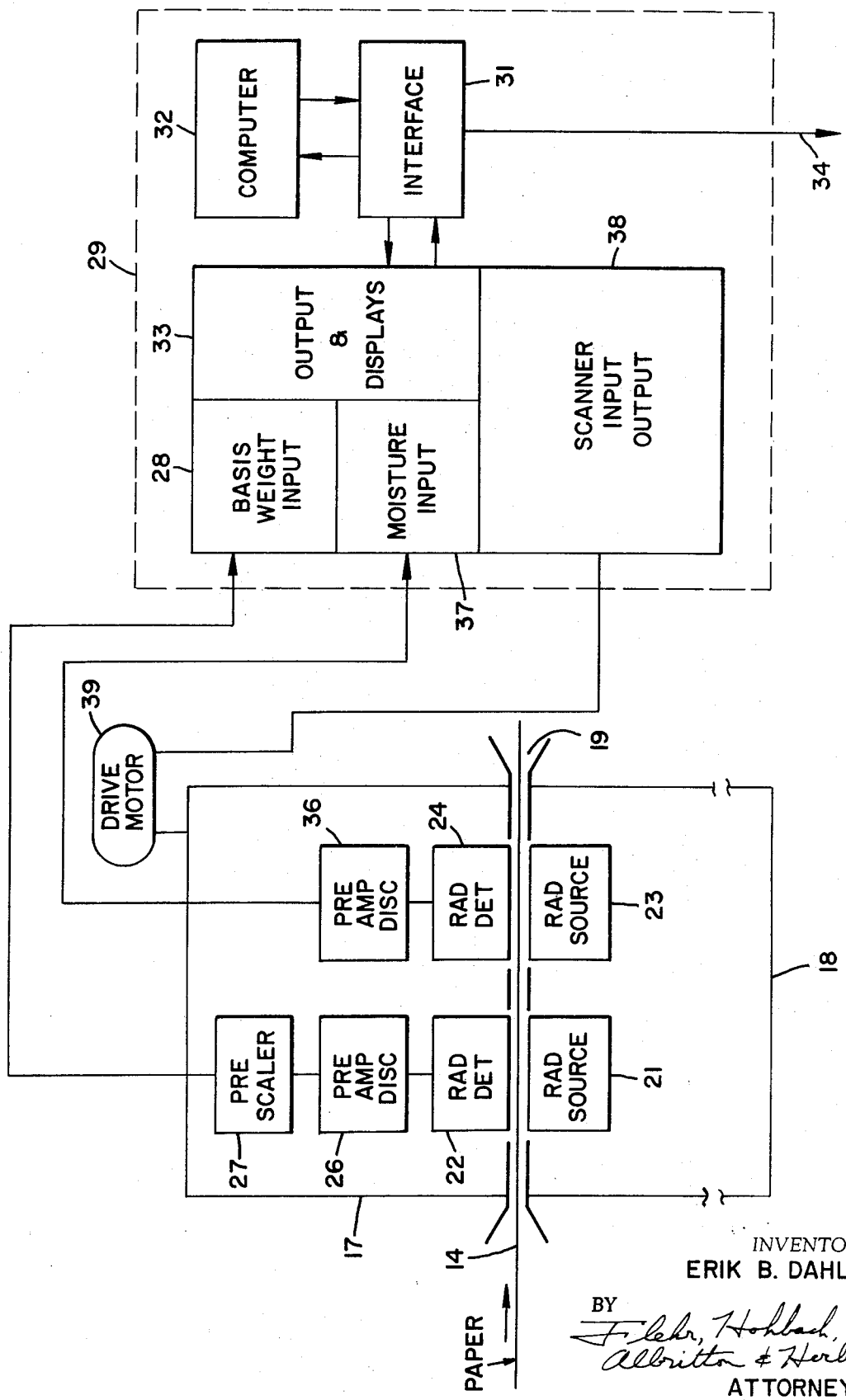

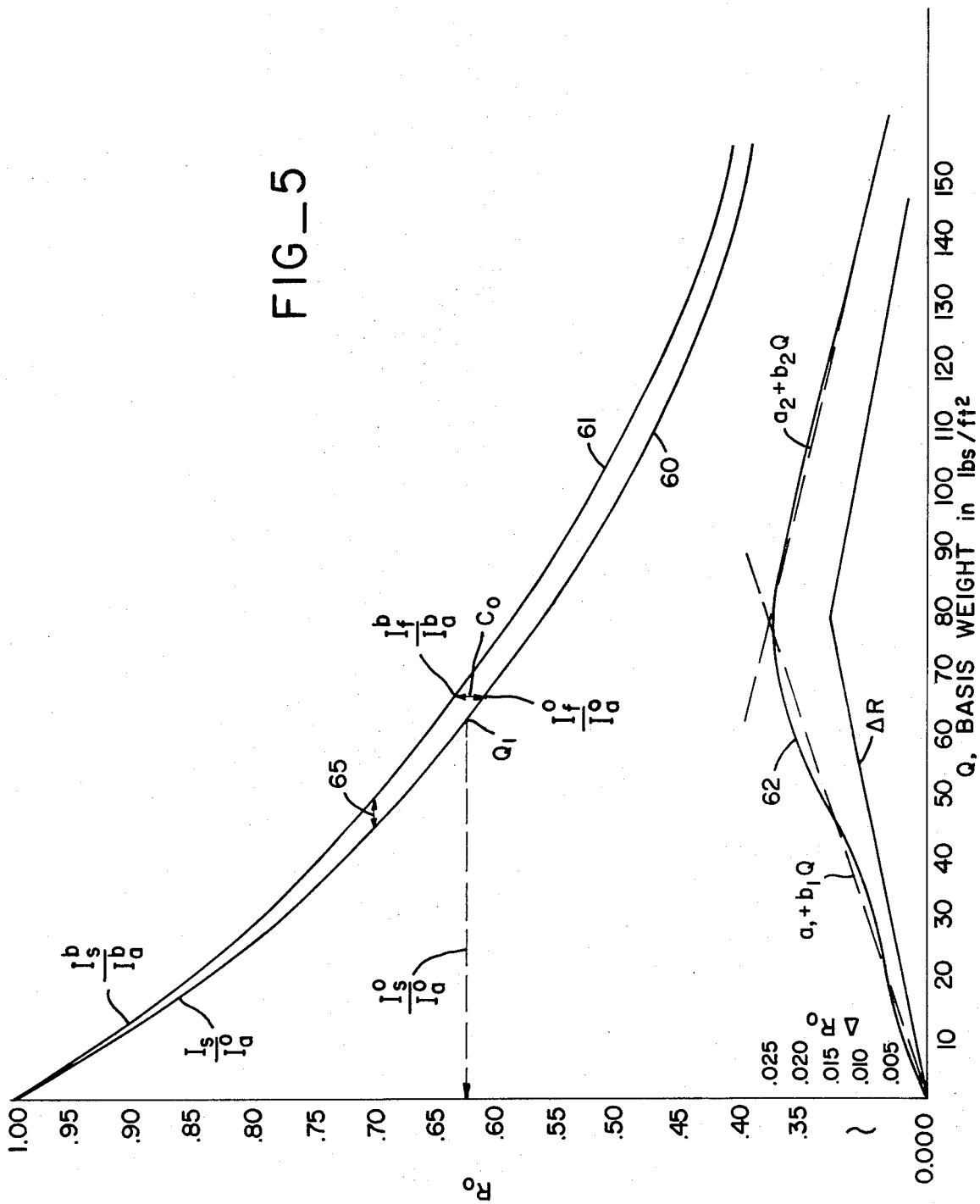
FIG_5

BASIS WEIGHT GAUGE STANDARDIZING SYSTEM

BACKGROUND OF THE INVENTION

The present invention is directed to a method of standardizing a basis weight gauge and more particularly to a method in which the gauge scans sheet material.

Due to the extreme ambient conditions under which basis weight gauges must operate there is an inherent tendency of the parameters of the gauge to drift. A portion of this drift is due to temperature changes and another portion to dirt buildup in the radiation path of the gauge. Thus, the gauge indication of basis weight must be compensated or standardized.

One method of standardization is disclosed and claimed in a copending application entitled "Basis Weight Gauging Apparatus, System and Method" in the names of Bossen et al., Ser. No. 791,972 filed Jan. 17, 1969. This method while suitable for many purposes may not be sufficiently accurate for some uses.

OBJECTS AND SUMMARY OF THE INVENTION

It is, therefore, an object of the present invention to provide an improved method of standardizing a basis weight gauge.

It is another object of the invention to provide a method as above which is extremely accurate.

In accordance with the above objects there is provided a method of standardizing a basis weight gauge for measuring the weight per unit area of a sheet material. Such a gauge has a radiation source and radiation detector with a gap therebetween for directing radiation along a path toward the material and for detecting the amount of radiation transmitted through the material. The transmitted radiation is a measure of the basis weight of the material substantially in accordance with Beer's law. The gauge also includes standard means having a predetermined and stable basis weight and movable to be interposed in the radiation path. The method includes the following steps: (a) providing at least one reference sample of a material having a measured basis weight; (b) placing the reference sample in the gap and obtaining a measurement of the radiation transmitted through the sample; (c) constructing a first calibration curve from the measurement of the material of known basis weight the curve relating basis weight as a function of transmitted radiation substantially in accordance with Beer's law; (d) constructing a second calibration curve by the simulation of dirt in the radiation path whereby the second curve is displaced from the first curve; (e) placing the standard in the gap and measuring an initial shift due to the dirt simulation; (f) obtaining a function of the calibration curve displacement as a function of one of the two variables of the calibration curves; (g) updating the displacement function for the effect of current ambient conditions including the effects of air density changes due to temperature variation and other temperature effects and dirt buildup in the radiation path including the steps of (1) scanning offsheet and obtaining a current value of transmitted radiation with no sheet material in the radiation path but with the standard in the path to obtain a current standard shift, (2) updating the displacement function by relating the current standard shift to the initial standard shift; and (h) scanning the sheet material and measuring the current transmitted radiation and relating the updated displacement function to the first calibration curve along with such current measurement to obtain a standardized basis weight value.

BRIEF DESCRIPTION OF THE DRAWINGS

FIG. 1 is a partial perspective view of a portion of a basis weight gauge used in the method of the present invention;

FIG. 2 is a block diagram of certain of the electrical equipment and electronics utilized in the present invention;

FIG. 3 is an elevation view partially cut away and shown in section of a radiation source used in the present invention;

FIG. 4 is an end view of FIG. 3 taken along the line 4—4; and

FIG. 5 shows several curves useful in understanding and practicing the present invention.

DETAILED DESCRIPTION OF THE PREFERRED EMBODIMENT

As disclosed in the above Bossen et al. copending application, a characteristic of a web or sheet material being manufactured by a paper making machine can be measured by mounting a radiation detector and a radiation source on a carriage. The carriage scans in a cross direction while the sheet material is moving in a machine or perpendicular direction to the cross direction. FIG. 1 illustrates a scanner 10 which includes a framework 11 having a pair of spaced upper and lower parallel beams 12 and 13 which extend laterally of the sheet material or paper indicated at 14 which is being produced by the paper making machine (not shown). The paper 14 travels through the scanner in the direction shown by the arrow 16. Upper and lower gauging heads 17 and 18 are provided in the framework 11 and are adapted to travel longitudinally of the framework and transversely of the paper sheet 16.

Specifically, paper sheet 14 travels through a gap 19 provided between the gauging head 17 and 18. The drive for the gauging heads is such that they can be moved offsheet or in other words, off to the side of the sheet during each direction of travel.

As best shown in FIG. 2 the lower gauging head 18 contains a radiation source 21 which emits radiation that is directed along a radiation path toward the paper 14. The intensity of radiation which is transmitted through the paper 14 is sensed by a radiation detector 22. In other words, the radiation detector senses the amount of radiation absorbed by the material which gives a direct indication of the basis weight of the material. This is in substantial accordance with Beer's law which is expressed as follows:

$$I = I0\ e^{-\mu x} \qquad (1)$$

Where $e$ is the natural log base, $\mu$ is the mass absorption coefficient which is a function of the radiation energy from the source and of the type of material being measured, $x$ is the weight per unit area of the material being measured in terms of milligrams per square centimeter, $I_o$ is the intensity of radiation reaching the radiation detector in the absence of the absorbing material, and I is the intensity of radiation reaching the detector in the presence of the radiation absorbing the material.

Still referring to FIG. 2 the radiation source 21 preferably emits beta radiation for the measurement of basis weight. Also includes in gauging head 18 is a radiation source 23 which emits infrared radiation for the purpose of making moisture content measurements. Such infrared radiation is sensed by a radiation detector 24 in gauging head 17. A preamplifier discriminator 26 is coupled to the radiation detector 22 to process the radiation events counted by detector 22 and the output of discriminator 26 is coupled to a prescaler 27 to a basis weight input unit 28. The basis weight unit 28 is part of an overall digital processor unit 29 which in conjunction with an interface unit 31 and a computer 32 processes the raw information from the gauging head 17 to provide an input at unit 33 of the actual basis weight of the paper, for example, in graphical form, and also other characteristics such as moisture. In addition, interface unit 31 has an output at 34 which may be used to control actual parameters of the paper machine or sheet material.

Radiation detector 24 is coupled to its preamplifier discriminator 36 and then to a moisture input unit 37 which is part of the digital processor 29. Lastly, a scanner input/output unit 38 controls drive motor 39 to provide the proper scanning both on-sheet and offsheet for heads 17 and 18.

The foregoing system shown in FIG. 2 is described and disclosed in greater detail in the above mentioned Bossen et al application.

FIG. 3 shows a partial cross sectional view of the radiation source 21 of FIG. 2. A cylindrical lower body section 41 contains a radioactive source capsule 42. A center plate 43 is coupled to the end of body 41 and meets with an upper body member 44 which includes an aperture 46 through which radiation from radiation capsule 42 may be directed toward the sheet material. Such radiation, however, is selectively interrupted by a shutter mechanism 47 which is driven through a shaft 48 by a rotary solenoid 49.

In accordance with the invention, standard means 51 having a predetermined and stable basis weight is provided which may be interposed in the radiation path through the window 46. The standard means are better shown in FIG. 4 and includes a polyester disc 52 of a predetermined and stable basis weight which is cemented across the frame 53. Frame 53 is pivoted for rotation on a shaft 54 which is driven through a universal joint 56 by a rotary solenoid unit 57. Operation of the shutter 47 and standard unit 51 are controlled by the digital processing unit 29 illustrated in FIG. 2.

In accordance with the method of the present invention calibration of the basis weight gauge is carried out by obtaining the curves shown in FIG. 5. Such calibration is usually done in the factory and the set of curves shown in FIG. 5 is supplied to the customer for his use. Data from these curves are then stored in the on site computer 32 illustrated in FIG. 2.

A first calibration curve 60 is obtained by placing several reference samples of sheet material in gap 19 and plotting several points for the curve. The curve 60 conforms substantially to Beer's law in accordance with the following equation $$Q = Q_1 - \frac{1}{\mu_1} \log_e \frac{I_s}{I_a^0} \Big/ \frac{I_s^0}{I_a^0} \qquad (2)$$

where $Q$ is basis weight, $Q_1$ is the specific basis weight of a selected known sample of one of the several samples which is preferably in the middle of the range of intended usage, $I_s$ are the measurements of the received intensity of radiation with the reference samples in the gap and, $I_s^0$ indicates the radiation intensity for the $Q_1$ sample. In order to compensate for the decay of the radiation source, $I_a^0$ is measured which is the received radiation intensity with only air in the radiation path. Thus, the calibration curve 60 is in effect a ratio $R_0 = I_s/I_a^0$. The ratio, of course approaches 1 as the basis weight of the sample approaches 0.

$\mu_1$, the mass absorption coefficient is determined as discussed above by the characteristic of the radiation source and the material. It is calculated by the following $$\mu_1 = -\frac{1}{Q_2 - Q_1} \log_e \frac{I_2}{I_1} \qquad (3)$$

where $Q_2$ and $Q_1$ are basis weights of samples in the intended range of usage and $I_2$, $I_1$ are the corresponding intensity measurements. The actual calculation of $\mu$ is not normally necessary but may be if the basis weight gauging system requires a new radiation source or if a radically different type of paper or sheet material is being produced.

Normally when the basis weight gauge is placed in use the calibration curve 60 will be shifted or displaced due to both dirt buildup as discussed above and temperature changes. In the present state of the art, however, it cannot be ascertained whether the drift is due exclusively to temperature, exclusively to dirt buildup, for example, on the window of the radiation source or exactly what proportional share may be due to both effects. However, it has been discovered that drift due to either temperature or dirt appear to function or produce equivalent changes. Thus, compensation or standardization for one effect will compensate for the other.

In accordance with the invention dirt is simulated in the radiation path to produce an artificially displaced calibration curve 61. Dirt may be simulated by placing a material in the radiation path, as is done in the preferred embodiment or alternatively by changing the temperature of the air column of the path or by changing the geometry. Curve 61 is a function of the ratio $I_s^b/I_a^b$ which are radiation intensity readings taken with a dirt simulator or bias placed in the radiation path both with material samples in the gap 19 and with only a bias material in the gap. More specifically, the dirt simulation or biasing material is a light basis weight sheet material relative to the sheet material measured but is heavy enough to provide a substantial displacement of the calibration curve 61 from curve 60. The dirt simulating material may be placed in the radiation path by, for example, taping it on one of the plates covering either the radiation source or detector. The second calibration curve 61 is therefore of the form $$Q = Q_1 - \frac{1}{\mu_1} \log_e \frac{I_s^b}{I_a^b} \Big/ \frac{I_s^0}{I_a^0} \qquad (4)$$

The amount of displacement of curves 60 and 61 designated $\Delta R_o$ is shown by the curve 62 which is the difference between the ratios $I_s/I_a$ and $I_s^b/I_a^b$. Straight line approximations have been made of curve 62 which are functions of the type $a_1 + b_1Q$, $a_2 + b_2Q$. Depending on the complexity of curve 62 more straight line approximations may, of course, be made. In actual practice, the straight line approximation which is in the range of the basis weight being measured would of course be used in the present method.

Thus far it is apparent from the foregoing that the displacement of curves 60 and 61 illustrate how the basis weight gauge will be affected by drifts in the system. However, to determine the actual amount of drift the standard means 51, as best shown in FIGS. 3 and 4, are provided which relate an initial shift due to the dirt simulation carried on at the factory during calibration to a shift due to the actual dirt buildup temperature change, and gauge geometry shifts for example, after each scan of the scanning head.

More specifically in finding the initial shift designated $C_0$ in FIG. 5, standard flag 51 is placed in the gap and the received radiation, $I_s^0$ is measured. Additionally the dirt simulation is provided by taping, for example, on the plate facing the radiation source 21, a material of the proper basis weight as discussed above. The received radiation then measured is $I_s^b$. The other terms of the required ratio $I_a^0$ and $I_a^b$ have, of course, have already been determined. Thus, the difference $C_0$ between the ratios $I_s^b/I_a^b$ and $I_s^0/I_a^0$ represents the initial standard shift $C_0$.

With the foregoing data the basis weight gauge utilizing the present invention has now been fully calibrated. The crucial information contained in the curves of FIG. 5 are then stored in the customer's computer and the following use made of this information.

The displacement function $\Delta R_0$ is updated for the effects of current or ambient conditions including the effects of air density changes due to temperature variation and other temperature effects, dirt buildup in the radiation path and gauge geometry shifts. This updating includes scanning offsheet of the paper 14 and obtaining a current value, $I_f$, of the transmitted radiation with no sheet material in the radiation path but with the standard 51 in the path. In addition a current reading of received intensity with nothing in the path, in other words $I_a$ is obtained. Thus, the difference $I_f/I_a - I_s^0/I_a^0$ designated C represents the current flag shift. The displacement function $\Delta R_0$ is, therefore updated by $$\Delta R = (a + bQ) \times \frac{C}{C_0} \qquad (5)$$

where the $a$ and $b$ constants are chosen in the proper basis weight measurement range. Such updating is illustrated in FIG. 5 by the curve, $\Delta R$, which is the curve 62 which has been reduced by the ratio $C/C_0$.

After the above updating occurs, the actual basis weight may be obtained by using a current measurement I which is obtained by scanning the sheet material in accordance with $$Q = Q_1 - \frac{1}{\mu_1} \log_e \frac{\frac{I}{I_a} - \Delta R}{\frac{I_s^0}{I_a^0}} \qquad (6)$$

In equation (6) $I_a$ and $\Delta R$ have of course, been updated by a recent offsheet reading. $I_s^0/I_a^0$ along with $\mu_1$ and $Q_1$ are stored constants.

It has been found in actual practice that the method of the present invention provides a long term stability of measurement of the order of one-fourth to one-third of 1 percent of actual sample weight.

The criteria for the basis weight of the standard used in the present invention is that if the paper being measured is of a single grade, it should be near the basis weight of this sheet material and if multiple grades then, of course, it should be chosen to be in the middle of the basis weight values. In addition to a single standard, of course, a wheel containing several standards could be provided. This would allow a standard shift to be used closest to the basis weight of the particular grade being measured.

It should also be emphasized that the standard readings do not necessarily fall on the calibration curves 60 and 61. This still does not nullify the validity of the standard shift since it is the relative standard shift which is used as a compensation factor.

The value of $Q_1$ and $\mu_1$ used in the present invention should, of course, also be changed or be within a limited range of basis weights which are to be measured. This provides greater accuracy.

The actual standardization of the method of the present invention may occur after every scan or after a number of scans.

Although in the preferred embodiment $\Delta R_0$ or the displacement function curve has been shown as varying with the basis weight any other type of representation could be used to show the displacement of the curves 60 and 61. For example, the displacement along the horizontal axis or a slant axis could also be used equally as well. However, if this is done the standard shift ratio $C/C_0$ must be normalized to the different displacement functions. In the case where the horizontal distance 65 of the curve of FIG. 5 is used for the displacement function, this is done by taking the slope of the calibration curve into account at the point of interest. Specifically, curve 60 would serve as the hypotenuse of a right triangle the vertical standard shift ratio would form the vertical leg and the horizontal leg would then be the new correction factor for the $\Delta R_0$ curve or function.

I claim:

1. A method of standardizing a basis weight gauge for measuring the weight per unit area of a sheet material such gauge having a radiation source and radiation detector with a gap therebetween for directing radiation along a path towards said material and for detecting the amount of radiation transmitted through said material, said transmitted radiation being a measure of the basis weight of said material substantially in accordance with Beer's law, said gauge also including standard means having a predetermined and stable basis weight and movable to be interposed in said radiation path,
said method including the following steps:

a. providing at least one reference sample of a material having a measured basis weight;
b. placing said reference sample in said gap and obtaining a measurement of the radiation transmitted through said sample;
c. constructing a first calibration curve from said measurement of said sample of material of known basis weight said curve relating the independent variable, basis weight, as a function of the dependent variable, transmitted radiation, substantially in accordance with Beer's law;

d. constructing a second calibration curve by the simulation of dirt in said radiation path whereby said second curve is displaced from first curve;

e. placing said standard in said gap and measuring an initial shift due to said dirt simulation;

f. obtaining a function of said calibration curve displacement as a function of one of said two variables of said calibration curves;

g. updating said displacement function for the effects of current ambient conditions including the effects of air density changes due to temperature variation and other temperature effects and dirt buildup in the radiation path including the steps of, 1. obtaining a current value of the transmitted radiation with no sheet material in said radiation path but with said standard in said path to obtain a current standard shift, 2. updating said displacement function by relating said current standard shift to said initial standard shift; and h. placing said sheet material in said gap and measuring the current transmitted radiation and relating said updated displacement function to said first calibration curve along with such current measurement to obtain a standardized basis weight value.

2. A method as in claim 1 where said dirt simulation provides a basis weight which is light relative to the basis weight of the sheet material being measured but is heavy enough to provide a substantial displacement in said calibration curves.

3. A method as in claim 1 wherein several reference samples are provided and measured for said construction of said first calibration curve.

4. A method as in claim 1 wherein step (f) said function is basis weight.

5. A method as in claim 1 together with the additional steps of making said measurements of steps (b) and (d) with no sample in said path and said measurement of step (g)(1) with only air in said path.

6. A method of standardizing a basis weight gauge for measuring the weight per unit area of a sheet material such gauge having scanning means for scanning said material and for carrying a radiation source and radiation detector with a gap therebetween for directing radiation along a path towards said material and for detecting the amount of radiation transmitted through said material said transmitted radiation being a measure of the basis weight of said material in accordance with Beer's law, said gauge also including standard means having a predetermined and stable basis weight within the range of basis weights of the sheet material to be measured and movable to be interposed in said radiation path, said method including the following steps:

a. providing several reference samples of said material having measured basis weights, $Q$;

b. placing said reference samples in said gap and obtaining measurements, $I_s$, of the radiation transmitted through said samples and additionally simulating dirt in said radiation path and obtaining measurements, $I_s^b$, of the radiation received by said detector after attenuation by said dirt simulation and said samples;

c. removing said samples and obtaining a measurement, $I_a^b$, of attenuation of said radiation caused by substantially only said dirt simulation and air in said radiation path;

d. measuring the received radiation, $I_a^o$, with only air in said radiation path;

e. constructing a first calibration curve of the form $$Q = Q_1 - \frac{1}{\mu_1} \log_e \frac{I_s}{I_a^0} \bigg/ \frac{I_s^0}{I_a^0}$$

where $Q_1$ is the basis weight of a selected known sample, $\mu_1$ is the mass absorption coefficient which is determined by $$\mu_1 = -\frac{1}{Q_2 - Q_1} \log_e \frac{I_2}{I_1}$$

where $I_2$, $I_1$ are measures of the received radiation for said $Q_1$ sample and a $Q_2$ sample said equation being derived from the foregoing equation;

f. constructing a second calibration curve of the form $$Q = Q_1 - \frac{1}{\mu_1} \log_e \frac{I_s^b}{I_a^b} \bigg/ \frac{I_s^0}{I_a^0}$$

whereby said second curve is displaced from first curve;

g. placing said standard in said radiation path and measuring radiation received, $I_f^o$, and additionally simulating said same dirt in said radiation path and measuring radiation received $I_f^b$, the difference between the ratios $I_f^b/I_a^b$ and $I_f^o/I_a^o$ representing an initial standard shift, $C_0$;

h. obtaining a function $\Delta R_o$ of the difference between said ratios $I_s^b/I_a^b$ and $I_s/I_a^o$ of said two calibration curves and making straight line approximations of such function of the type $a_1 + b_1 Q$, $a_2 + b_2 Q$, etc;

i. updating said displacement function, $\Delta R_o$ for the effects of current ambient conditions including the effects of air density changes due to temperature variation and other temperature effects and dirt buildup in the radiation path including the steps of, 1. scanning offsheet and obtaining a current value of $I_f$ the transmitted radiation with no sheet material in said radiation path but with said flag in said path and also obtaining a current reading, $I_a$, of $I_a^o$ the difference $$\frac{I_f}{I_a} - \frac{I_f^0}{I_a^0}$$

representing current flag shift, $C$, 2. updating said displacement function $\Delta R_o$ by $$\Delta R = (a + bQ) \times \frac{C}{C_0};$$

and j. scanning said sheet material and measuring the current transmitted radiation, $I$, and relating said updated displacement function, $\Delta R$, to said first calibration curve along with such current measurement, $I$, to obtain a standardized basis weight value, $Q$, in accordance with the equation $$Q = Q_1 - \frac{1}{\mu_1} \log_e \frac{\frac{I}{I_a} - \Delta R}{\frac{I_s^0}{I_a^0}}$$

7. A method of standardizing a basis weight gauge for measuring the weight per unit area of a sheet material such gauge having a radiation source and radiation detector with a gap therebetween for directing radiation along a path towards said material and for detecting the amount of radiation transmitted through said material, said transmitted radiation being a measure of the basis weight of said material substantially in accordance with Beer's law, said gauge also including standard means having a predetermined and stable basis weight and movable to be interposed in said radiation path, said method including the following steps:

obtaining a calibration function relating basis weight as a function of transmitted radiation;

obtaining a displacement function of said calibration function, which is indicative of the change in measured basis weight, and obtaining an initial displacement of the measured basis weight of said standard means by artificially shifting said calibration function, updating said displacement function by obtaining a current displacement of said standard means and by comparing said current displacement to said initial displacement; and placing said sheet material in said gap and obtaining its basis weight by relating said updated displacement function to said calibration function.

8. A method as in claim 7 where said artificial shift is produced by simulation of dirt in said radiation path.

9. A method as in claim 7 where said calibration function is a curve which is displaced by simulation of dirt in said radiation path and said displacement function is the difference between said original curve and the displaced curve.

* * * * *